J. G. CROUCH.
MUD OR ICE TREAD FOR AUTOMOBILE WHEELS.
APPLICATION FILED MAY 12, 1916.
1,214,435.
Patented Jan. 30, 1917.
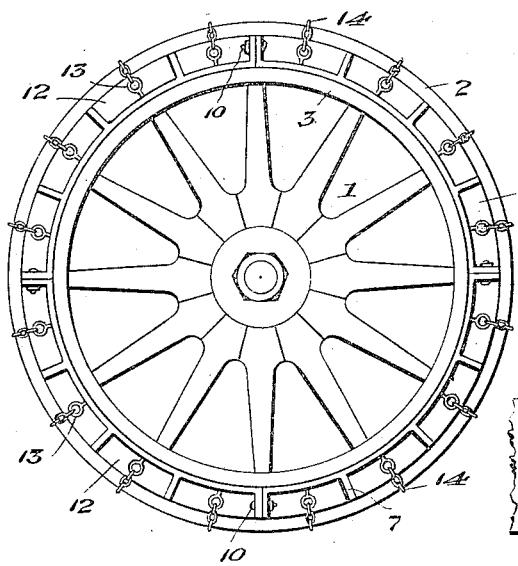
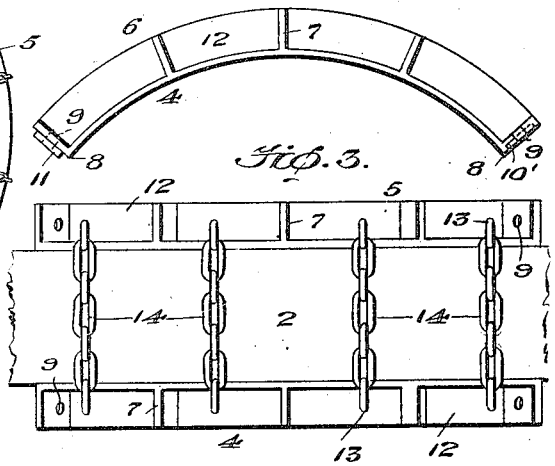
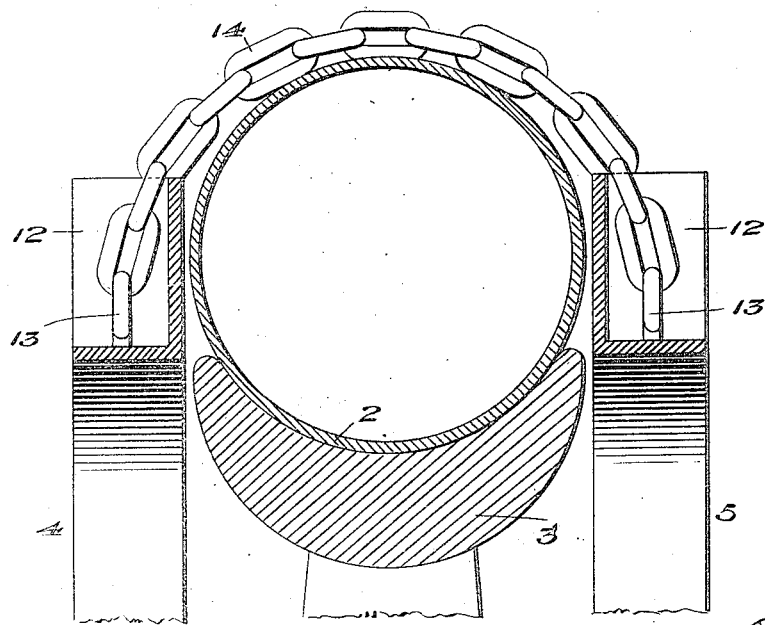
Inventor
John Greer Crouch
Witness

UNITED STATES PATENT OFFICE.

JOHN GREER CROUCH, OF EVANSVILLE, INDIANA.

MUD OR ICE TREAD FOR AUTOMOBILE-WHEELS.

1,214,435.     Specification of Letters Patent.     Patented Jan. 30, 1917.

Application filed May 12, 1916. Serial No. 97,031.

*To all whom it may concern:*

Be it known that I, JOHN GREER CROUCH, a citizen of the United States, residing at Evansville, county of Vanderburgh, and State of Indiana, have invented certain new and useful Improvements in Mud or Ice Treads for Automobile-Wheels, of which the following is a specification.

This invention relates to mud or ice treads for automobile wheels.

My object is to provide a simple, strong, durable and inexpensive sectional tread which can be rapidly and easily applied to an automobile wheel and will have chains or equivalent tread parts adapted to bridge the tire of the wheel and form a mud or ice tread therefor to prevent slipping.

My invention comprehends the provision of two frames composed of connected sections and adapted to be disposed on opposite sides of the wheel, and cross connections, such as chains or equivalent devices which bridge the tire and connect the sections of the frame on one side of the wheel with those on the other side thereof.

The invention also comprehends certain novel combinations and arrangements of parts appearing more fully hereinafter.

In the accompanying drawings: Figure 1 is a side elevation showing the invention applied to an automobile wheel and tire; Fig. 2, a detail cross section thereof; Fig. 3, a detail plan view; and Fig. 4, a detail side view of one of the frame sections.

The automobile wheel is shown at 1 as provided with tire 2 and felly 3.

The frames 4 and 5 which are adapted to be located on opposite sides of the wheel 1, are each composed of a plurality of sections, one of which is shown at 6 in Fig. 4. The frames 4 and 5 are preferably of circular form and may be composed of as many sections as desired. Each section is preferably of angular cross sectional shape and provided with strengthening ribs 7. The ends 8 are provided with bolt-holes 9 to receive bolts 10 which connect the ends 8 of one section 6 to those of another section of the frames 4 and 5. Preferably, the end 8 at one extremity of the section 6 is provided with a square or polygonal pocket 10' and the other extremity of the section has a corresponding projection 11 to fit in the pocket 10' of the next section 6. With this construction, although but a single bolt 10 be used to connect the end parts 8, any twisting or turning of the sections 6 out of a given plane is prevented.

In the pockets 12 intermediate the webs 7 and the webs and ends 8, are located eyes 13. Corresponding eyes 13 of sections 6 on opposite sides of the wheel 1 are connected by chains 14 which bridge the tire 2 and form the non-slipping mud or ice tread for the tire.

The frames 4 and 5 are held in position by the cross connecting tread chains 14, as shown in Fig. 2.

The device can be quickly and easily applied to or removed from a wheel by simply applying or removing a sufficient number of the bolts 10 which connect the sections comprising one or the other of the frames 4 or 5.

Having thus described my invention, what I claim as new and desire to secure by Letters Patent, is:—

A mud and ice tread for automobile wheels, comprising frames composed of attachable and detachable sections of angular cross sectional shape provided with webs at intervals thereof and at their abutting ends, said frames being adapted for disposition on opposite sides of the wheel, and tread devices connected to the frames within the pockets intermediate the webs thereof and straddling the tire of the wheel.

In testimony whereof, I hereunto affix my signature.

JOHN GREER CROUCH.